United States Patent
Qu et al.

(10) Patent No.: US 7,492,073 B2
(45) Date of Patent: Feb. 17, 2009

(54) SUPERCONDUCTING ROTATING MACHINES WITH STATIONARY FIELD COILS

(75) Inventors: Ronghai Qu, Clifton Park, NY (US); James William Bray, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 355 days.

(21) Appl. No.: 11/479,586

(22) Filed: Jun. 30, 2006

(65) Prior Publication Data

US 2008/0001495 A1    Jan. 3, 2008

(51) Int. Cl.
*H02K 1/22*    (2006.01)
(52) U.S. Cl. ...................... 310/178; 310/268
(58) Field of Classification Search .......... 310/268, 310/178–180, 166, 168
See application file for complete search history.

(56) References Cited

U.S. PATENT DOCUMENTS

| | | | |
|---|---|---|---|
| 4,001,617 A | | 1/1977 | Boyer |
| 4,031,421 A | | 6/1977 | Geiger |
| 4,499,392 A | | 2/1985 | Giacoletto |
| 4,816,709 A | | 3/1989 | Weldon |
| 5,057,726 A | | 10/1991 | Mole et al. |
| 5,177,387 A | * | 1/1993 | McMichael et al. ......... 310/90.5 |
| 5,710,476 A | * | 1/1998 | Ampela ...................... 310/268 |
| 5,831,362 A | * | 11/1998 | Chu et al. ................... 310/90.5 |
| 5,982,070 A | | 11/1999 | Caamano |
| 6,100,620 A | | 8/2000 | Radovsky |
| 6,445,105 B1 | * | 9/2002 | Kliman et al. .............. 310/268 |
| 6,531,799 B1 | | 3/2003 | Miller |
| 6,737,777 B2 | * | 5/2004 | Werfel et al. ............... 310/90.5 |

(Continued)

FOREIGN PATENT DOCUMENTS

GB    2091950    8/1980

(Continued)

OTHER PUBLICATIONS

P. Tsao et al., "A Synchronous Homopolar Machine for High-Speed Applications," IEEE, 0-7803-7420, Jul. 2, 2002, pp. 406-415.

(Continued)

*Primary Examiner*—Michael C Zarroli
(74) *Attorney, Agent, or Firm*—Penny A. Clarke

(57) ABSTRACT

A machine includes a stator assembly that includes a stator yoke, a pair of armature coils mechanically coupled to the stator yoke, and a stationary superconducting field coil. The stator yoke comprises a magnetic material. The machine further includes a shaft rotatably mounted in the stator yoke, the shaft comprising a non-magnetic material. The machine further includes a rotor assembly rotationally engaged with the shaft. The rotor assembly includes a rotor disk extending between the armature coils, the rotor disk having an inner portion and an outer portion. The outer portion of the rotor disk includes a number of circumferentially-spaced, magnetic poles. The rotor disk is coupled to the shaft for rotation about the shaft and generation of a rotating permeance wave. The stationary superconducting field coil is disposed between the stator yoke and the rotor disk, and the stationary superconducting field coil is configured as a stationary magnetomotive force (MMF) source for the rotating permeance wave produced by the rotor assembly to produce a rotating magnetic field.

23 Claims, 9 Drawing Sheets

U.S. PATENT DOCUMENTS

| | | | |
|---|---|---|---|
| 6,750,588 | B1 | 6/2004 | Gabrys |
| 6,794,783 | B2 | 9/2004 | Tu et al. |
| 6,803,691 | B2 | 10/2004 | Rose |
| 6,809,453 | B2 | 10/2004 | Narita et al. |
| 6,924,574 | B2 | 8/2005 | Qu et al. |
| 7,049,724 | B2 | 5/2006 | Qu et al. |
| 7,207,178 | B2 * | 4/2007 | Steinmeyer .................. 62/6 |
| 2004/0212258 | A1 | 10/2004 | Laskaris et al. |
| 2004/0239201 | A1 | 12/2004 | Sivasubramaniam et al. |
| 2006/0028085 | A1 | 2/2006 | Qu et al. |
| 2006/0066110 | A1 | 3/2006 | Jansen et al. |
| 2006/0071575 | A1 | 4/2006 | Jansen et al. |
| 2008/0007132 | A1 * | 1/2008 | Weeber et al. .............. 310/178 |

FOREIGN PATENT DOCUMENTS

| | | |
|---|---|---|
| GB | 2087165 | 5/1982 |
| JP | 64-26341 | 1/1989 |
| JP | 3289344 | 12/1991 |
| JP | 11-113241 | 4/1999 |
| JP | 2001091642 | 4/2001 |

OTHER PUBLICATIONS

A. Metin et al., "Performance Evaluation of An Exial Flux Consequent Pole PM Motor Using finite Element Analysis," IEEE, 0-7803-7817, Feb. 3, 2003, pp. 1682-1687.

"High-temperature superconducting motors ready for sale," The Naval Architect, Jun. 2005, pp. 47-48.

Cutaway diagram of IHI high-temperature superconducting motor. 1 page.

"Development of World's First Practical-Level Liquid Nitrogen-Cooled Superconductor Motor," Jan. 20, 2005, 4 pages.

T. Okazaki et al., "Liquid Nitrogen cooled HTS Motor for Ship Propulsion," IEEE, 1-4244-0493, Feb. 2006, 6 pages.

* cited by examiner

1

SUPERCONDUCTING ROTATING MACHINES WITH STATIONARY FIELD COILS

STATEMENT REGARDING FEDERALLY SPONSORED RESEARCH & DEVELOPMENT

This invention was made with Government support under contract number FA8650-04-G-2466-001 awarded by the United States Air Force (USAF). The Government has certain rights in the invention.

BACKGROUND OF THE INVENTION

The present invention relates generally to electrical motor/generators, and more particularly to machines including superconducting windings.

Typically, designs for superconducting electric machines include a superconducting field coil installed on the rotor. The superconducting coil is maintained at a temperature below its critical temperature using a continuous supply of cryogenic fluid, such as liquid helium (He) for conventional superconductors and liquid nitrogen ($N_2$) or neon (Ne) for high temperature superconductors (HTS). In order to cool the field coil, the cryogenic fluid is typically supplied to the superconducting field coil from a stationary cryocooler through a transfer coupling that is coupled to one end of the rotor. The transfer coupling channels the cryogenic fluid from a stationary portion to a rotating portion of the rotor. The cryogenic fluid is then routed through a cooling loop thermally coupled to the superconducting field coil and then back to the transfer coupling for return to the stationary cryocooler. This transfer of cryogenic fluid from a stationary cryocooler to a rotating cooling loop adds considerable complexity to the overall system design.

In addition, installation of a superconducting field coil on the rotor subjects the superconducting field coil to substantial thermal stresses, centrifugal stresses, and electrical design challenges. One such electrical design challenge is providing an electrical connection through the rotor to power the superconducting field coil. Accordingly, designing, fabricating and operating such a rotor may be difficult. For example, the superconducting coils, especially HTS coils, may be sensitive to mechanical strain. Specifically, because the coils are coupled to the rotor, the coils may be subjected to centrifugal forces that may cause strains and degrade the performance of the superconductor. In addition, because the coil is maintained at a cryogenic temperature, an elaborate support system may be needed to maintain the coil in position against the centrifugal forces while preserving the integrity of the thermal insulation between the coil and the parts of the rotor at ambient temperature.

To overcome these issues, a radial flux homopolar inductor alternator (HIA) machine has been proposed, as described in commonly assigned U.S. patent application Ser. No. 10/444, 253, filed May 21, 2003, titled "METHODS AND APPARATUS FOR ASSEMBLING HOMOPOLAR INDUCTOR ALTERNATORS INCLUDING SUPERCONDUCTING WINDINGS." More recently, an axial-flux superconducting machine structure employing stationary field coils was disclosed in U.S. Pat. No. 7,049,724, titled "SUPERCONDUCTING ROTATING MACHINES WITH STATIONARY FIELD COILS AND AXIAL AIRGAP FLUX." By attaching the superconducting field coil to the stator, these designs overcome the above-discussed problems presented by superconducting machines employing field coils installed on the rotor. Advantages of the axial-flux stationary superconducting field coil structure over the radial flux design include improved torque density and more effective use of machine volume, by virtue of the higher ratio of airgap to machine volume. The relatively small usable airgap is a design challenge presented by the radial flux design. The axial-flux stationary superconducting field coil structure employs a split stator, which adds to the complexity of the machine.

Accordingly, it is desirable to provide a machine with improved performance characteristics, such as increased torque density, increased reliability, less-complex designs, improved manufacturability, and better field coil positions.

BRIEF DESCRIPTION OF THE INVENTION

One aspect of the invention resides in a machine, such as a motor or a generator, that includes a stator assembly comprising a stator yoke, a pair of armature coils mechanically coupled to the stator yoke, and a stationary superconducting field coil. The stator yoke comprises a magnetic material. The machine further includes a shaft rotatably mounted in the stator yoke, the shaft comprising a non-magnetic material. The machine further includes a rotor assembly rotationally engaged with the shaft, the rotor assembly comprising a rotor disk extending between the armature coils, the rotor disk comprising an inner portion and an outer portion, wherein the outer portion of the rotor disk comprises a number of circumferentially-spaced, magnetic poles. The rotor disk is coupled to the shaft for rotation about the shaft and generation of a rotating permeance wave. The stationary superconducting field coil is disposed between the stator yoke and the rotor disk, and the stationary superconducting field coil is configured as a stationary magneto-motive force (MMF) source for the rotating permeance wave produced by the rotor assembly to produce a rotating magnetic field.

Another aspect of the invention resides in a machine, such as a motor or a generator, that includes a stator assembly comprising a stator frame, a pair of armature coils mechanically coupled to the stator frame, and at least one stationary superconducting field coil. The machine further includes a shaft rotatably mounted in the stator frame, the shaft comprising a non-magnetic material. The machine further includes a rotor assembly rotationally engaged with the shaft, the rotor assembly comprising a rotor disk extending between the armature coils, the rotor disk comprising an inner portion and an outer portion. Each of the inner and outer portions comprises at least one magnetic material. The outer portion of the rotor disk comprises a number of circumferentially-spaced, magnetic poles. The rotor disk is coupled to the shaft for rotation about the shaft and generation of a rotating permeance wave. The stationary superconducting field coil is coupled to an interior portion of the stator frame, and the stationary field coil is configured as a stationary magneto-motive force (MMF) source for the rotating permeance wave produced by the rotor assembly to produce a rotating magnetic field.

DETAILED DESCRIPTION OF THE INVENTION

Figure 1:
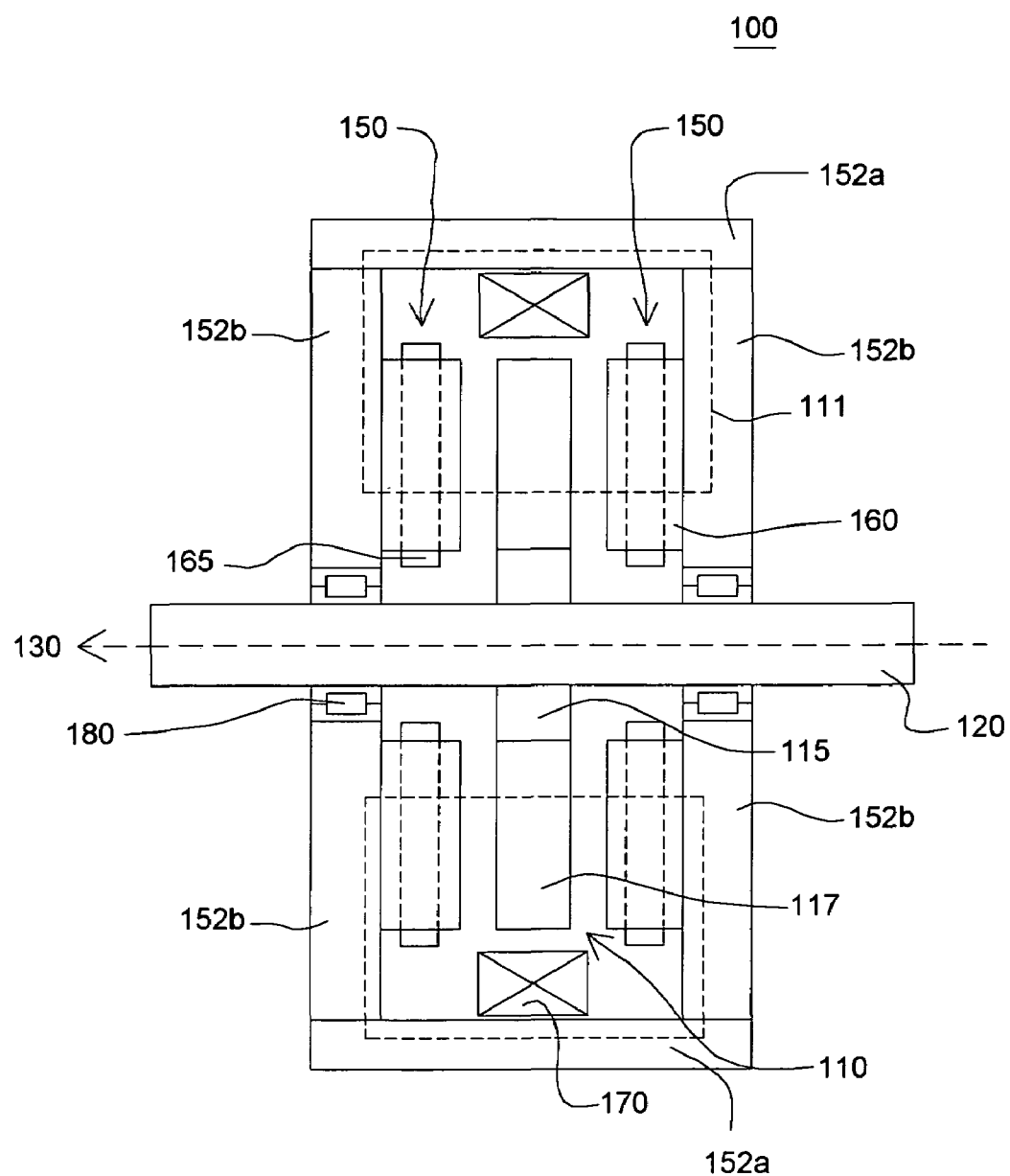
FIG. 1 is a cross-sectional view of an exemplary embodiment of an electrical machine.

FIG. 1 is a cross-sectional view of an exemplary embodiment of an electrical machine 100. The machine 100 may operate as a motor and/or as a generator as desired. The machine 100 includes a stator assembly 150 having a stator yoke 152, a pair of armature coils 165 mechanically coupled to the stator yoke 152, and a stationary superconducting field coil 170. The stator yoke 152 comprises a magnetic material, and a variety of materials can be used to form the yoke 152, non-limiting examples of which include iron, magnetic steel, silicon iron, and iron-cobalt alloys. In one example, the cross bar portion 152a of the yoke is formed of a different material than are the legs 152b of the yoke. For example, in a particular embodiment cross-bar 152a comprises a solid material and legs 152b comprise laminates, in order to reduce AC field induced eddy current losses in the yoke. The machine 100 further includes a shaft 120 rotatably mounted in the stator yoke 152 and formed of a non-magnetic material, non-limiting examples of which include aluminum and alloys thereof, non-magnetic stainless steel, composites, fiber-reinforced polymers, and titanium and alloys thereof.

A rotor assembly 110 is rotationally engaged with the shaft 120 and has a rotor disk (also indicated by reference numeral 110) extending between the armature coils 165. In order to accommodate large magnetic flux magnitudes, the magnetic material employed in the rotor disks may be characterized by a high saturation magnetization, for particular embodiments, for example above 1.7 Tesla, more particularly above 1.8 Tesla and still more particularly about 2.3 Tesla. This is particularly important for machines employing superconducting field coils, as discussed below. More generally, a wide variety of magnetic materials can be used to form the rotor disks, non-limiting examples of which include magnetic steel, iron-cobalt alloys, and silicon iron (such as M19). In addition, the disks may comprise laminated structures to reduce eddy current losses from the changing magnetic fields. The specific material selected will depend upon the strength, weight and cost requirements for the application. As indicated in FIG. 1, the rotor disk 110 has an inner portion 115 and an outer portion 117. The outer portion 117 of the rotor disk has a number of circumferentially-spaced, magnetic poles 112, as shown for example in FIGS. 2-4. The rotor disk 110 is coupled to the shaft 120 for rotation about the shaft and generation of a rotating permeance wave. Embodiments of the rotor disks are described in detail below with reference to FIGS. 2-4.

For the machine depicted in FIG. 1, the stationary superconducting field coil 170 is disposed between the stator yoke 152 and the rotor disk 110. Beneficially, by positioning the stationary superconducting field coil 170 in the stator assembly 150, the stationary superconducting field coil 170 is mechanically decoupled from the rotor assembly 110.

In operation, the stationary superconducting field coil 170 is configured as a stationary magneto-motive force (MMF) source for the rotating permeance wave produced by the rotor assembly to produce a rotating magnetic field. More particularly, the rotating magnetic field is a direct current (DC) field that has an alternating current (AC) effect on the stator windings due to flux pulsation. As indicated by the dashed lines 111 in FIG. 1, the rotating magnetic field is characterized by a flux loop 111 that extends along the stator yoke 152 and across the outer portion of the rotor disk 110 to supply a time varying magnetic flux to the armature coils 165. In particular, the field coil 170 and the magnetic poles 112 are configured relative to each other such that a rotating magnetic field with a substantially axial airgap flux is produced when the rotor 110 is rotated related relative to the stator assembly 150 around a predetermined axis 130.

Figure 7:
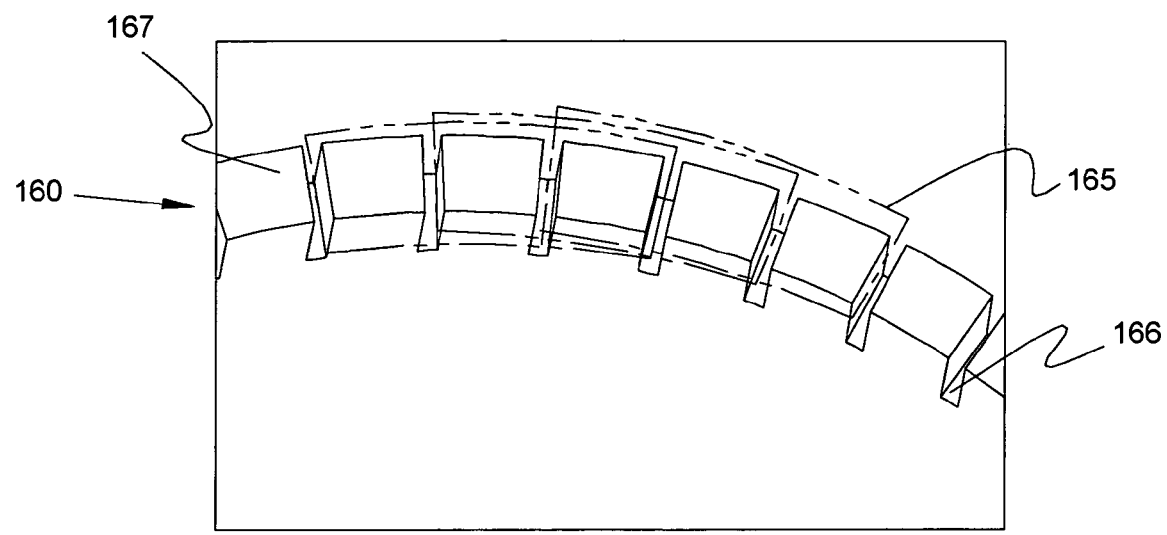
FIG. 7 illustrates an exemplary configuration for an armature winding.

For the exemplary machine illustrated in FIG. 1, the stator assembly 150 further includes a pair of stator cores 160 mechanically coupled to the stator yoke 152. As indicated in FIG. 1, each of the stator coils 165 is mounted on a respective one of the stator cores 160. FIG. 7 illustrates an exemplary multi-phase configuration for an armature winding. For the exemplary arrangement of FIG. 7, the armature windings are arranged to form a set of multiple phase windings. More particularly, the stator core 160 defines a number of slots 166 disposed between teeth 167, and the armature windings 165 are arranged in the slots to form the multiple phase windings. For the particular arrangement shown in FIG. 7, stator coils 165 are wound around three (3) stator teeth 167. This example configuration is purely illustrative, and other winding configurations may be employed, including but not limited to stator coils 165 that are wound across six (6) stator slots 167, such that each coil 165 crosses 5 slots 166.

Figure 8:
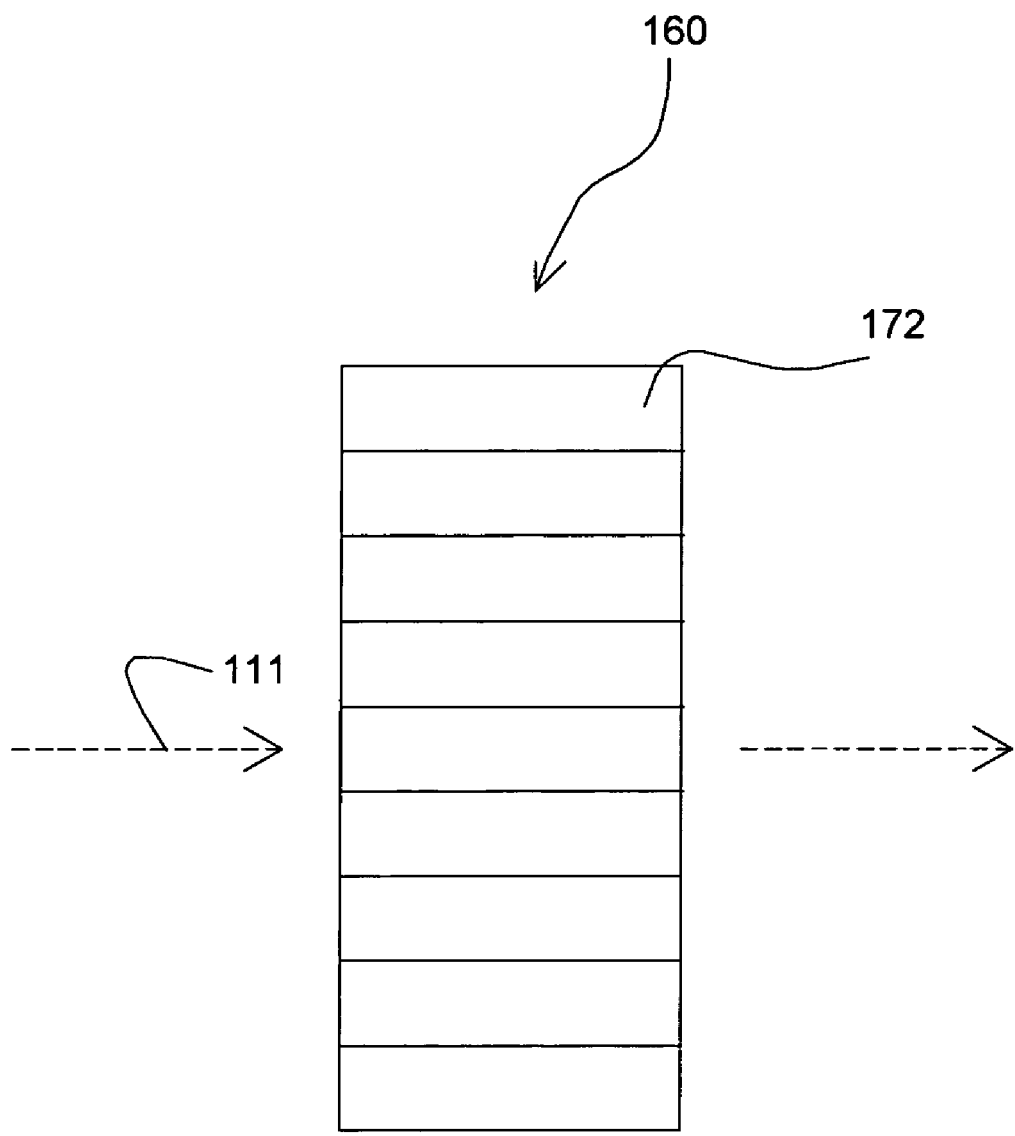
FIG. 8 schematically depicts a laminated stator core.
Figure 9:
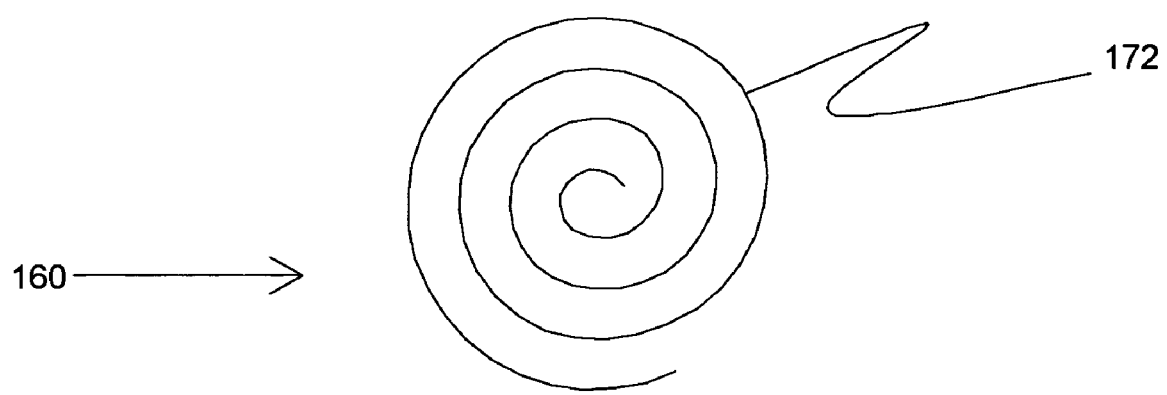
FIG. 9 schematically depicts a spiral-wrapped laminated stator core.

The shaft 120 is rotatably mounted in the stator yoke 152 on bearings 180, as schematically depicted in FIG. 1, for example. The stator cores 160 may be magnetic or non-magnetic. According to a particular embodiment, the stator cores 160 comprise a magnetic material. The inner portion 115 of the rotor disk 110 may comprise a magnetic or a non-magnetic material. Beneficially, for this magnetic stator core embodiment, the flux around the field coil is concentrated and directed by stator magnetic material into the split annular armature, where it crosses from one side of the armature to the other, crossing the rotor. The magnetic core stator 160 is particularly beneficial for use with superconducting armature windings 165 because the magnetic support structure for the armature reduces the field impinging upon the armature coil. Because the AC properties of superconductors can be relatively poor at high field levels (for example at or above about 2 Tesla), this reduction of the magnetic field at the armature windings improves the AC properties of the armature windings 165. According to a more particular embodiment, the magnetic stator cores 160 are formed of circumferential laminations, for example circumferential iron laminations, as shown for example in FIGS. 8 and 9. Beneficially, the use of iron laminations in stator cores 160 reduces the eddy current losses in the stator cores. Different materials may be used depending on the flux level. For example, the laminations may be formed of spiral wrapped M19 silicon iron for low flux levels. For high flux levels, the stator core 160 may be formed of iron-cobalt alloys, for example. As used herein, iron-cobalt alloys may include other minor constituents, for example to strengthen the alloy.

In a particular embodiment, the stator cores 160 comprise a non-magnetic material, non-limiting examples of which include non-magnetic stainless steel, aluminum and alloys thereof, titanium and alloys thereof, fiber reinforced polymers, composite materials and graphite, and the inner portion 115 of the rotor disk comprises a non-magnetic material, non-limiting examples of which include non-magnetic stainless steel, aluminum and alloys thereof, titanium and alloys thereof, fiber reinforced polymers, composite materials and graphite. This embodiment is applicable to high flux applications in which a magnetic material becomes saturated and thereby loses its ability to channel flux. This embodiment is often termed an air-core winding or approach. In this embodiment, it is also beneficial to produce the stator cores from non-electrically conducting materials to avoid eddy current losses.

Figure 2:
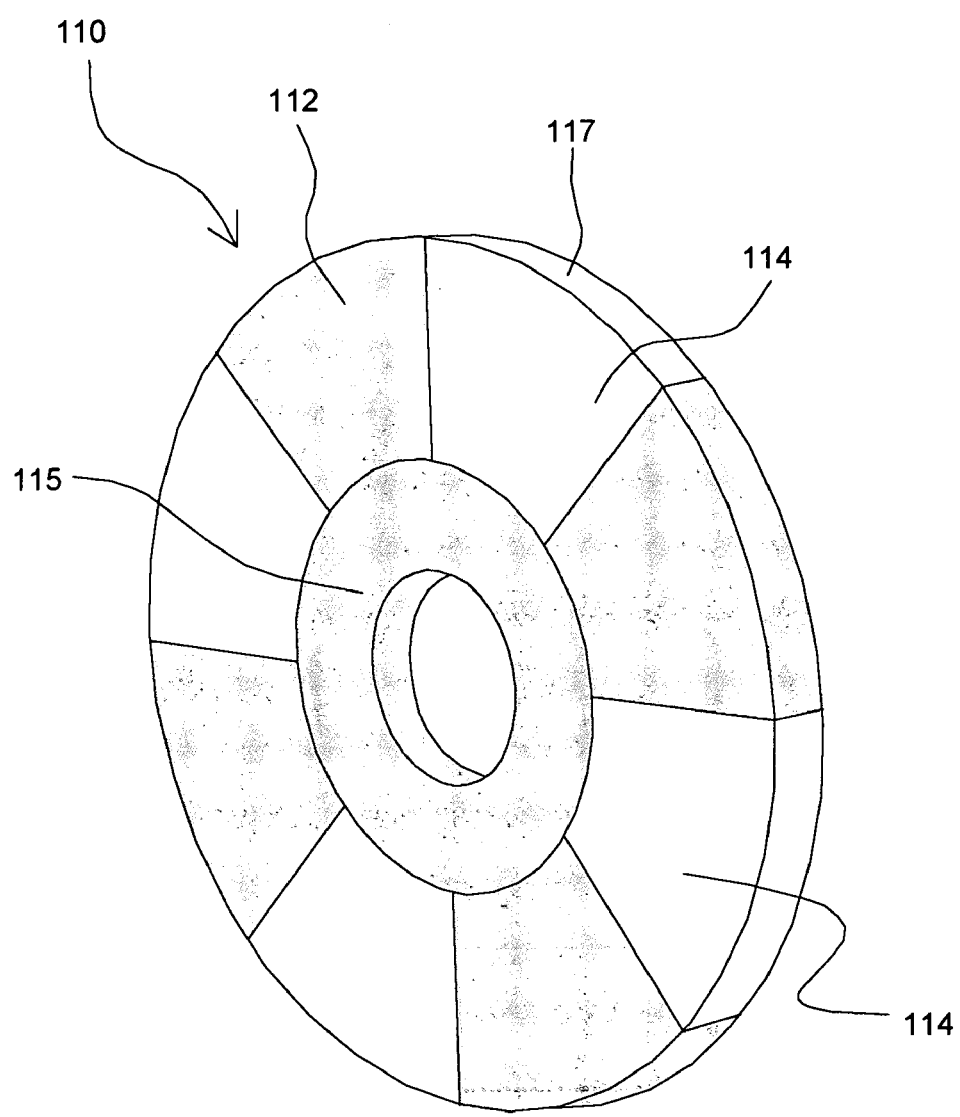
FIG. 2 is a plan view of an exemplary rotor segment that may be used with machine of FIG. 1.
Figure 5:
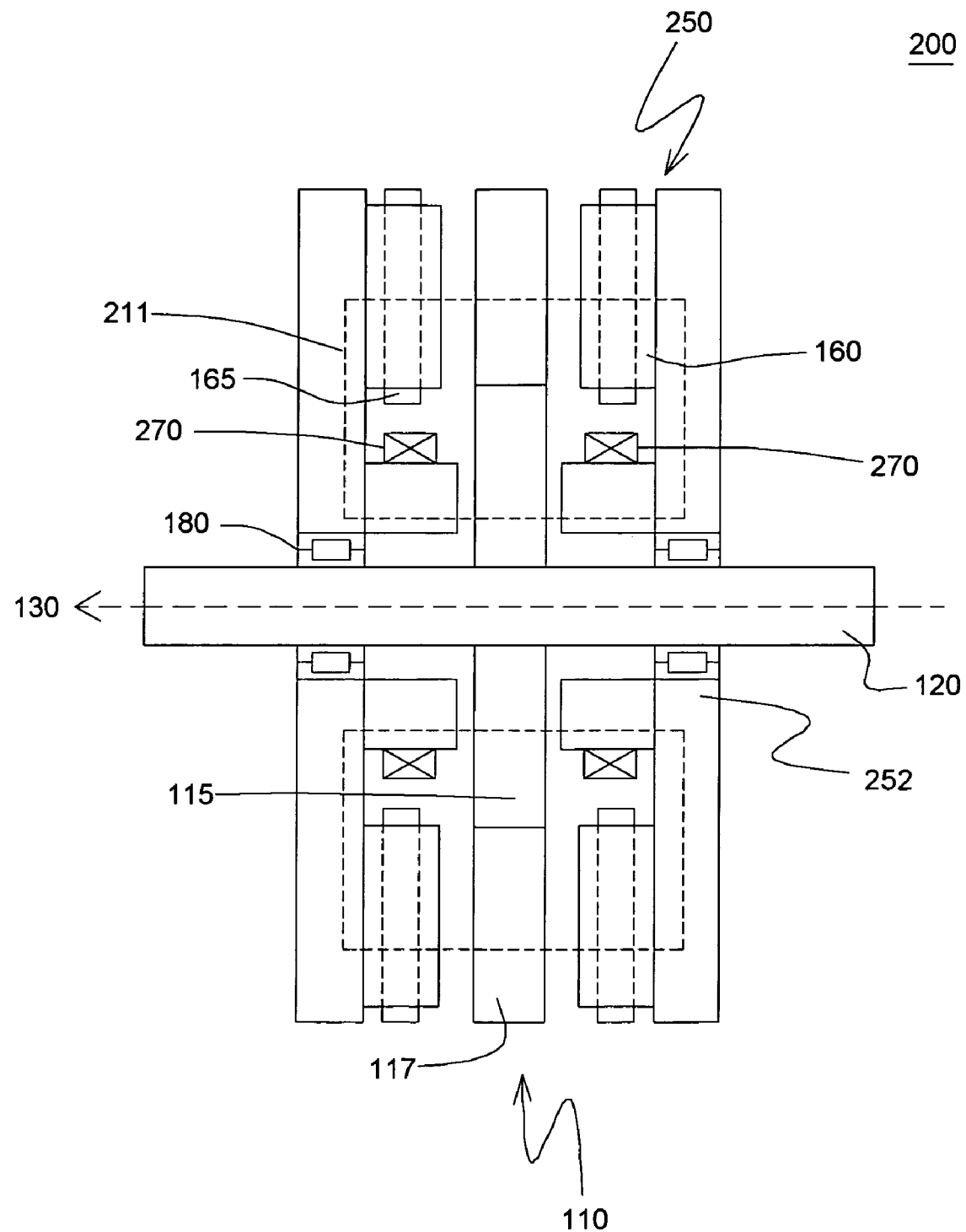
FIG. 5 is a cross-sectional view of another exemplary embodiment of an electrical machine.
Figure 6:
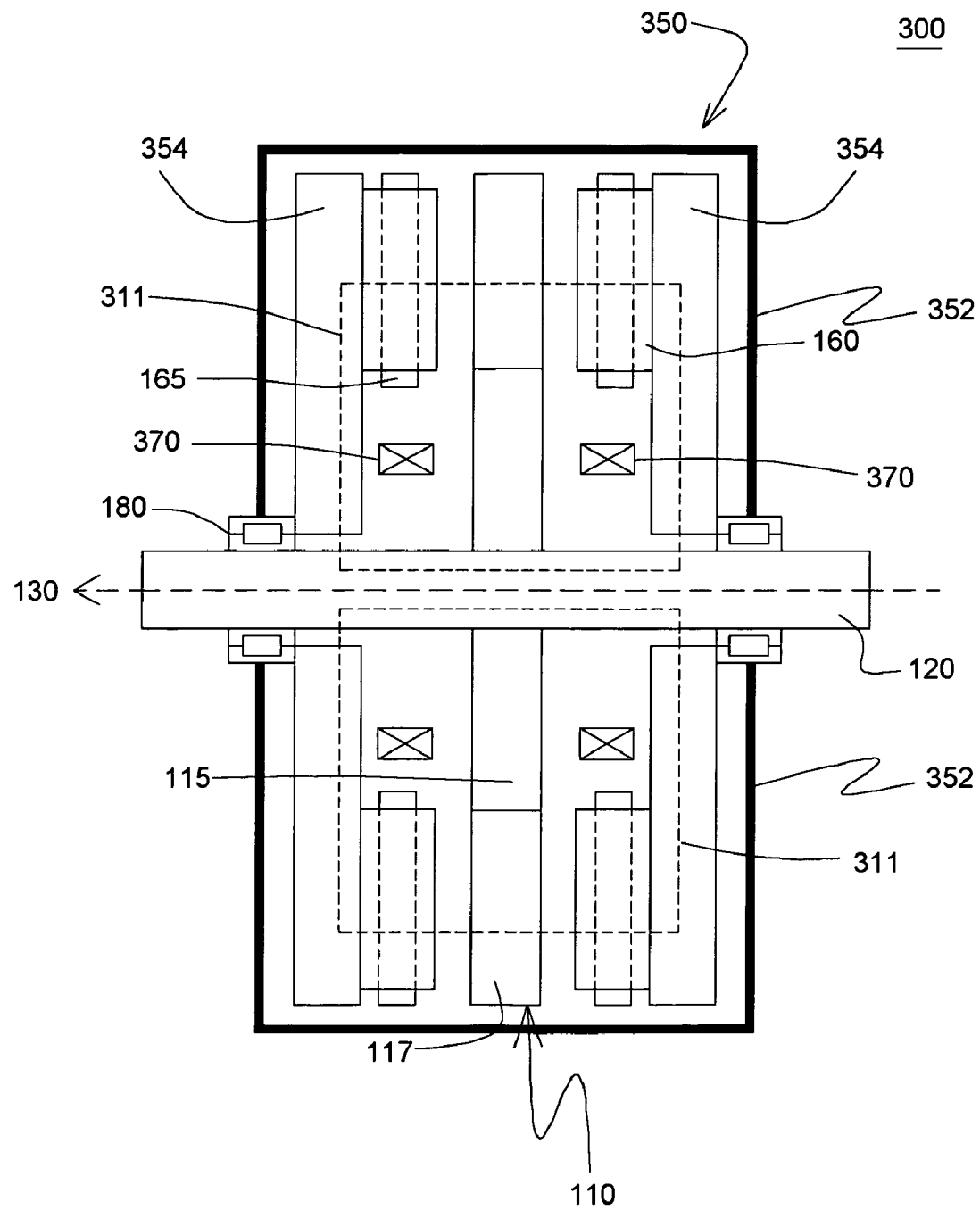
FIG. 6 is a cross-sectional view of another exemplary embodiment of an electrical machine.

FIG. 2 is a plan view of an exemplary rotor segment 110 that may be used with machine 100 of FIG. 1, as well as with machines 200 and 300 of FIGS. 5 and 6. The rotor segment 110 includes a central portion 115 for engaging the shaft. (See FIG. 1.) This central portion 115 may be adapted to accommodate fixtures or adapters, which secure the rotor segment 110 to the shaft 120. For the exemplary embodiment illustrated by FIG. 2, the outer portion 117 of the rotor disk comprises a magnetic material forming the magnetic poles 112 and a non-magnetic material forming a number of non-magnetic regions (or spacers) 114 separating the magnetic poles 112. In one non-limiting example, the magnetic poles 112 are formed of a ferromagnetic material, such as iron or iron-cobalt. Exemplary poles 112 and regions 114 are annular sector shaped or trapezoidal shaped, forming sets of circumferentially spaced poles 112 and regions 114.

Figure 3:
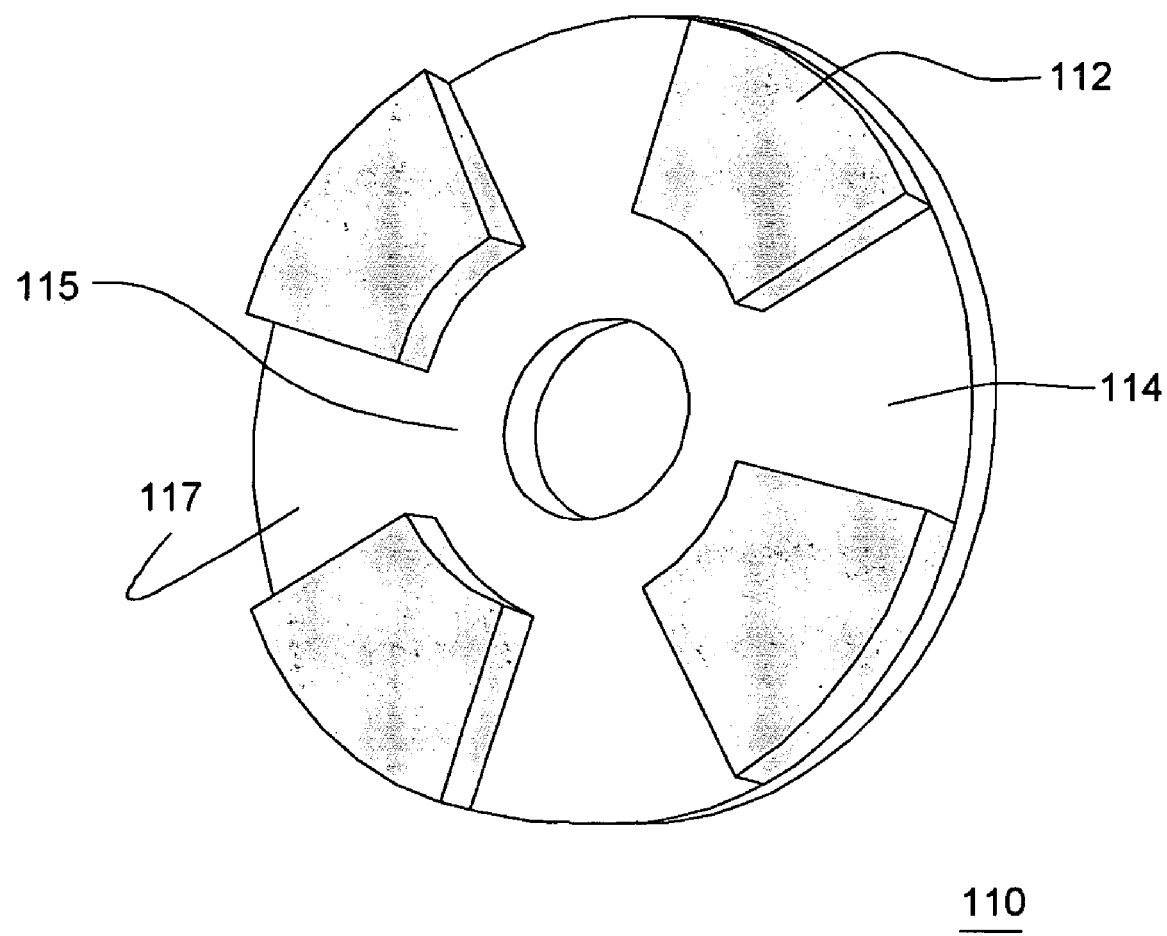
FIG. 3 is a plan view of another exemplary rotor segment that may be used with machine of FIG. 1.
Figure 4:
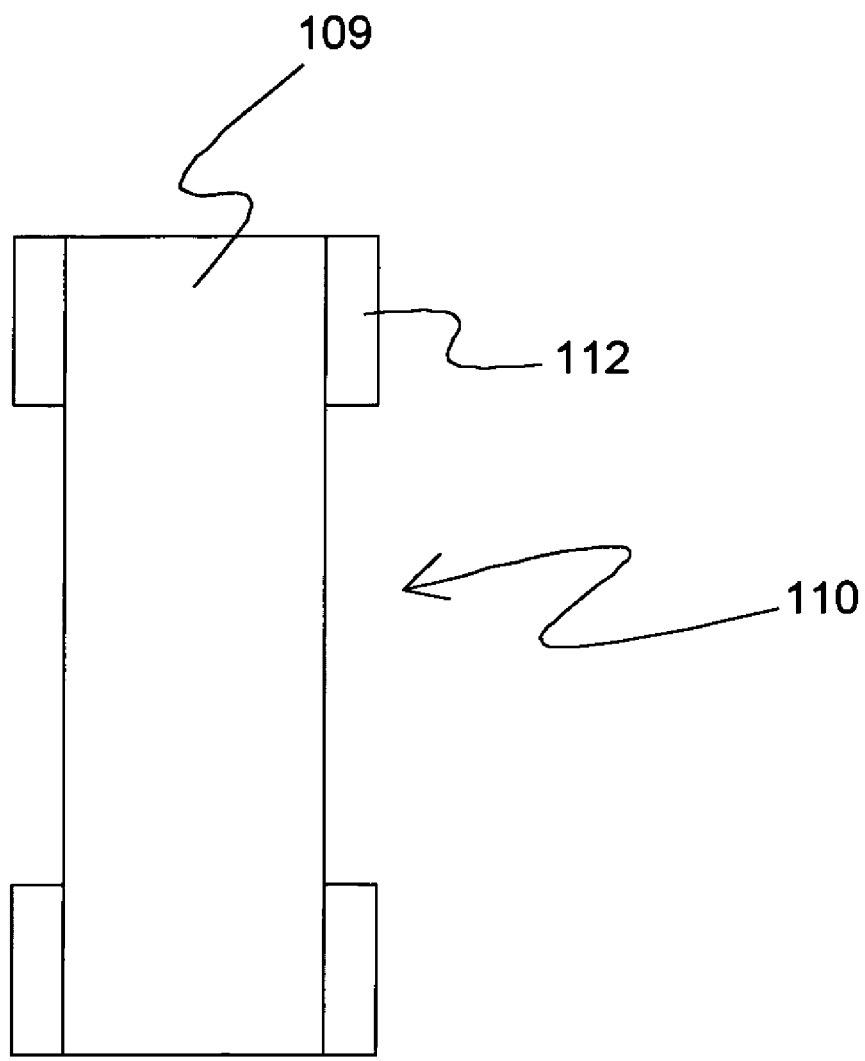
FIG. 4 shows the rotor segment of FIG. 3 in side view.

FIGS. 3 and 4 illustrate another rotor segment 110 embodiment for use with machine 100, as well as with machines 200 and 300 of FIGS. 5 and 6. For the exemplary embodiment illustrated in FIGS. 3 and 4, the magnetic poles 112 are separated by air spacings 114. As shown in FIG. 4, the magnetic poles 112 are formed on base 109 of rotor segment 110. The poles 112 may be attached to base 109 or may be of unitary construction. In operation, the rotor modulates the major flux path and supplies the time-varying flux for generator or motor action.

By forming the stationary field coil 170 from a superconducting material, the stationary field coil 170 exhibits substantially zero resistance to electrical current flow when cooled to superconducting temperatures. Beneficially, by using superconducting field coils, higher flux levels can be achieved, than with conventional copper coils. For example, peak fields of at least about 1.5 Tesla, and more particularly of at least about 2 Tesla can be achieved, where the peak field corresponds to the highest value of the magnetic field in the machine. In one embodiment, the field coil 170 comprises a low temperature superconductor (LTS), non-limiting examples of which include niobium titanium (NbTi), which is a type n superconductor with a critical temperature of 9 Kelvin and a critical magnetic field of 11 Tesla. The superconducting stationary field coil 170 is maintained at a temperature below the critical temperature of the superconducting material forming the coil 170. For example, a LTS stationary field coil 170 may be maintained at a temperature approaching four degrees Kelvin using a continuous supply of cryogenic fluid, such as, for example, but not limited to liquid helium (He). If a high temperature superconductor (HTS) is used in fabricating the field coil, a cryogenic fluid such as nitrogen ($N_2$) or neon (Ne) may be used to achieve superconducting temperatures. Non-limiting examples of HTS materials include yttrium barium copper oxide (YBCO), bismuth strontium copper oxides (BSCCO) and magnesium diboride ($MgB_2$). The cryogenic fluid is typically supplied to the superconducting field coil from a stationary cryocooler. Any suitable cooling fluid devices, such as cooling fluid tubes or conduits may be provided in the stator assembly 150 to cool the superconducting field coil 170. Cooling by conduction through thermally conducting materials is also possible.

In operation, the machine 100 may operate as an electrical generator or as a motor. When the machine 100 operates as a generator, the shaft 120 and the rotor assembly 110 are rotated about the longitudinal axis 130 of the shaft 120. The rotation of the shaft 120 and the rotor assembly 110 may be performed by applying a torque coupled to the shaft 120. The superconducting coil 170 is cooled to a temperature below its critical temperature $T_c$, and a DC electrical current is supplied to the stationary superconducting field coil 170 and the coil 170 acts as a stationary magnetomotive force (MMF) source for the rotating permeance wave of the rotating poles of the rotor to produce a rotating magnetic field. The rotating magnetic field has an airgap flux directed substantially axially along the longitudinal axis 130 of the shaft 120 and is magnetically coupled to the stator windings 165 which generates electrical power. When the machine 100 operates as a motor, electrical power is provided to the machine 100 to generate the rotating magnetic field and to cause the rotor assembly 110 to rotate relative to the stator assembly, which in turn rotates the shaft 120.

Armature windings 165 may be formed of conventional materials, such as copper, or may comprise superconducting windings. In one embodiment, the armature windings 165 comprise a low temperature superconductor (LTS), non-limiting examples of which include NbTi. In other embodiments, armature windings 165 comprise HTS materials, non-limiting examples of which include YBCO, BSCCO and $MgB_2$. For embodiments employing superconducting armature windings 165, the armature windings 165 are maintained at temperatures below the critical temperature of the superconducting material forming the windings 165. For example, superconducting armature windings 165 may be maintained at a temperature approaching four degrees Kelvin using a continuous supply of cryogenic fluid, such as, for example, but not limited to, liquid helium (He). If a high temperature superconductor (HTS) is used in fabricating the armature coil, a cryogenic fluid such as nitrogen ($N_2$) or Neon may be used to achieve superconducting temperatures. The cryogenic fluid is typically supplied to the superconducting armature coils from a stationary cryocooler. Any suitable cooling fluid devices, such as cooling fluid tubes or conduits may be provided in the stator assembly 150 to cool the superconducting coils 165. Cooling by conduction through thermally conducting materials is also possible.

As shown in FIG. 1, the stator cores 160 and associated armature windings 165 are located axially on either side of rotor segment 110 comprising magnetic poles 112 and non-magnetic spacers (or air spacings) 114. A number of such rotor/stator arrangements can be stacked axially along the shaft 120 for long machines.

The above described machine 100 includes the benefits of the radial-flux HIA machines of U.S. patent application Ser. No. 10/444,253, such as reliability, increased efficiency and smaller size, relative to conventional machines. In addition, machine 100 provides a higher torque density and lower weight relative to the radial-flux HIA machines. Compared with the axial-flux superconducting machine structure of U.S. Pat. No. 7,049,724, the machine 100 of the present invention provides a less complex design, in that it includes a single stator, and provides better field coil positions.

FIG. 5 is a cross-sectional view of another exemplary embodiment of an electrical machine 200. The machine 200 may operate as a motor and/or as a generator as desired. Many of the components of machine 200 are similar to those of machine 100, and common reference numerals are used to denote such components. As shown, the machine 200 includes a stator assembly 250 comprising a stator frame 252, a pair of armature coils 165 mechanically coupled to the stator frame 252, and at least one stationary field coil 270; The frame 252 may include one or more components. For the example shown in FIG. 5, the frame is formed of two portions. The machine 200 further includes a shaft 120 rotatably mounted in the stator frame 252, the shaft 120 comprising a non-magnetic material, non-limiting examples of which include stainless steel.

The machine 200 further includes a rotor assembly 110 rotationally engaged with the shaft 120. As shown, the rotor assembly 110 comprises a rotor disk (also indicated by reference numeral 110) extending between the armature coils 165. The rotor disk 110 has an inner portion 115 and an outer portion 117, and each of the inner and outer portions comprises at least one magnetic material, nonlimiting examples of which include iron-cobalt alloys, iron, silicon-iron and magnetic steel. The outer portion 117 of the rotor disk 110 has a number of circumferentially-spaced, magnetic poles 112. The rotor disk 110 is coupled to the shaft 120 for rotation about the shaft 120 and generation of a rotating permeance wave. Exemplary rotor segments 110 are shown in FIGS. 2-4. For the rotor disk 110 illustrated in FIG. 2, the outer portion 117 of the rotor disk 110 comprises a magnetic material forming the magnetic poles 112 and a non-magnetic material forming a number of non-magnetic regions 114 separating the magnetic poles 112.

For the machine 200 illustrated in FIG. 5, the stationary field coil 270 is coupled to an interior portion of the stator frame 252 as shown. Benefits of this field coil configuration include potentially higher flux generation from the use of two coils, continued ability to provide some flux generation in the event of a failure of one of the coils, and a potentially smaller diameter machine by placing the field coils inside the rotor diameter (for applications where machine diameter is restricted). In addition, the use of short field coils due to smaller radius can reduce the field coil cost. In operation, the stationary field coils 270 are configured as a stationary magneto-motive force (MMF) source for the rotating permeance wave produced by the rotor assembly 110 to produce a rotating magnetic field. As indicated by the dashed lines 211 in FIG. 5, the rotating AC magnetic field is characterized by a flux loop 211 that extends along the stator frame 252, across the inner portion 115 of the rotor disk, and across the outer portion 117 of the rotor disk to supply a time varying magnetic flux to the armature coils 165.

For the machine 200 illustrated in FIG. 5, the stator assembly 250 further includes a pair of stator cores 160 mechanically coupled to the stator frame 252. As indicated, each of the stator coils 165 is mounted on a respective one of the stator cores 160. For the machine 200 illustrated in FIG. 5, the shaft 120 is rotatably mounted in the stator frame 252 on bearings 180, as indicated. Advantages of this configuration include a more compact diameter for the machine, as well as the ability to use non-magnetic materials for the shaft, since it need not carry flux. According to a particular embodiment, the stator cores 160 comprise a magnetic material. Magnetic stator cores are discussed above. Non-magnetic stator cores may also be used in another embodiment.

For the exemplary embodiment illustrated in FIG. 5, the stator assembly 250 includes a pair of stationary field coils 270. As shown, each of the stationary field coils 270 is coupled to a respective interior portion of the stator frame 252. Each of the stationary field coils 270 is configured as a stationary magneto-motive force (MMF) source for the rotating permeance wave produced by the rotor assembly 110 to produce a rotating magnetic field.

According to a particular embodiment, the stationary field coils 270 are stationary superconducting field coils. The armature windings 165 may be formed of conventional materials or superconducting materials. In particular embodiments, the stator material 252 near the stator cores 160 is laminated for lower eddy current losses.

FIG. 6 is a cross-sectional view of another exemplary embodiment of an electrical machine 300. The machine 300 may operate as a motor and/or as a generator as desired. Many of the components of machine 300 are similar to those of machine 100, and common reference numerals are used to denote such components. As shown, machine 300 includes a stator assembly 350, which includes a stator frame 352, a pair of magnetic stator portions 354 mechanically coupled to the stator frame 352 and a pair of stator cores 160 mechanically coupled to respective ones of the magnetic stator portions 354. The stator assembly 350 further includes a pair of armature coils 165 mounted on respective ones of the stator cores 160, and at least one stationary superconducting field coil 370. For certain embodiments, the superconducting field coil(s) 370 comprises LTS materials, non-limiting examples of which include NbTi. For other embodiments, the superconducting field coil(s) comprises HTS materials, non-limiting examples of which include YBCO, BSCCO and MgB2. The armature windings 165 may be formed of conventional materials or superconducting materials. The stator frame 352 is formed of a non-magnetic material, non-limiting examples of which include aluminum and alloys thereof, non-magnetic stainless steel, composites, fiber-reinforced polymers, and titanium and alloys thereof.

As indicated in FIG. 6, machine 300 further includes a shaft 120 rotatably mounted in the stator frame 354. The shaft 120 is formed of a magnetic material. For particular embodiments, the magnetic material employed in the shaft 120 is characterized by a high saturation magnetization, for example above 1.7 Tesla, more particularly above 1.8 Tesla and still more particularly about 2.3 Tesla. Example magnetic materials for the shaft include, but are not limited to, iron-cobalt alloys. As discussed above, by using superconducting field coils, relatively high magnetic flux levels can be achieved. However, the magnetization value for the shaft 120 limits the peak magnetic field that can be used. Accordingly, it is desirable to form the shaft of high saturation magnetization magnetic material(s) in order to enable the shaft to convey high levels of magnetic flux. For the illustrated embodiment, the shaft 120 is rotatably mounted in the stator frame 352 on a number of bearings 180. As shown, the machine 300 further includes a rotor assembly 110 rotationally engaged with the shaft 120. The rotor assembly 110 includes a rotor disk (also indicated by reference numeral 110) extending between the armature coils 165. The rotor disk 110 has an inner portion 115 and an outer portion 117. The outer portion 117 of the rotor disk 110 has a number of circumferentially-spaced, magnetic poles 112, as shown for example in FIG. 2. The inner portion of the rotor disk 115 comprises a non-magnetic material, non-limiting examples of which include aluminum and alloys thereof, non-magnetic stainless steel, composites, fiber-reinforced polymers, and titanium and alloys thereof. The rotor disk 110 is coupled to the shaft 120 for rotation about the shaft 120 and generation of a rotating permeance wave.

As shown in FIG. 6, the stationary field coil(s) 370 is (are) disposed between the shaft 120 and a respective one of the stator cores 160. For the embodiment shown in FIG. 6, two stationary field coils 370 are provided in the stator assembly 350, with each of the stationary field coils 370 being disposed between the shaft and respective ones of the stator cores 160. In operation, the stationary superconducting field coil(s) 370 is (are) configured as a stationary magneto-motive force (MMF) source for the rotating permeance wave produced by the rotor assembly 110 to produce a rotating magnetic field.

As indicated by the dashed line 311 in FIG. 6, the rotating magnetic field is characterized by a flux loop 311 that extends along the shaft 120, along the magnetic stator portions 354 and across the outer portion 117 of the rotor disk 110 and the stator cores 160 to supply a time varying magnetic flux to the armature coils 165.

For the illustrated embodiment, the stator cores 160 comprise a magnetic material. Magnetic stator cores are discussed above with reference to machine 100. In particular embodiments, the magnetic stator cores 160 are formed of circumferential laminations, for example circumferential iron laminations, as shown for example in FIGS. 8 and 9, to reduce the eddy current losses in the stator cores Different materials may be used depending on the flux level, as discussed above with reference to machine 100. In addition, the outer portion 117 of the rotor disk 110 comprises a magnetic material forming the magnetic poles 112 and a non-magnetic material forming a number of non-magnetic regions 114 separating the magnetic poles 112, as shown for example in FIG. 2. In other embodiments, non-magnetic stator cores may be employed.

To form long machines for embodiments 100, 200 and 300, a number of the rotor/stator arrangements are stacked axially along the shaft. The synchronous machines 100, 200, 300 described above are preferably implemented with stationary superconducting field coils 170, 270 and 370. This arrangement allows the cooling fluids to be more easily supplied to the superconducting field coils. Transfer of cooling fluid from a stationary cooling system to a rotating superconducting coil is eliminated. In addition, transfer by conduction through thermally conducting materials becomes allowed if desired.

Exemplary embodiments of electrical generating systems are described above in detail. The systems are not limited to the specific embodiments described herein, but rather, components of each system may be utilized independently and separately from other components described herein. Each system component can also be used in combination with other system components.

Although the invention has been described in terms of various specific embodiments, those skilled in the art will recognize that the invention can be practiced with modification within the spirit and scope of the claims.

What is claimed is:

1. A machine comprising:
a stator assembly comprising a stator yoke, a pair of armature coils mechanically coupled to the stator yoke, and a stationary superconducting field coil, wherein the stator yoke comprises a magnetic material;
a shaft rotatably mounted in the stator yoke, the shaft comprising a non-magnetic material; and
a rotor assembly rotationally engaged with the shaft, the rotor assembly comprising a rotor disk extending between the armature coils, the rotor disk comprising an inner portion and an outer portion, wherein the outer portion of the rotor disk comprises a plurality of circumferentially-spaced, magnetic poles, the rotor disk being coupled to the shaft for rotation about the shaft and generation of a rotating permeance wave,
wherein the stationary superconducting field coil is disposed between the stator yoke and the rotor disk, wherein the stationary superconducting field coil is configured as a stationary magneto-motive force (MMF) source for the rotating permeance wave produced by the rotor assembly to produce a rotating magnetic field,
wherein the stator assembly further comprises a pair of stator cores mechanically coupled to the stator yoke, wherein each of the stator coils is mounted on a respective one of the stator cores, wherein the shaft is rotatably mounted in the stator yoke on a plurality of bearings,
wherein the stator cores comprise a magnetic material, and wherein the stator cores comprise circumferential laminations.

2. The machine of claim 1, wherein the rotating magnetic field is characterized by a flux loop that extends along the stator yoke and across the outer portion of the rotor disk to supply a time varying magnetic flux to the armature coils.

3. The machine of claim 1, wherein the magnetic poles are separated by air spacers.

4. The machine of claim 1, wherein the stationary superconducting field coil is configured to generate a peak field value in the machine of at least about 1.5 Tesla.

5. The machine of claim 1, wherein the armature windings comprise superconducting armature windings.

6. The machine of claim 1, further comprising a plurality of rotor and stator assemblies arranged along the shaft.

7. A machine comprising:
a stator assembly comprising a stator yoke, a pair of armature coils mechanically coupled to the stator yoke, and a stationary superconducting field coil, wherein the stator yoke comprises a magnetic material;
a shaft rotatably mounted in the stator yoke, the shaft comprising a non-magnetic material; and
a rotor assembly rotationally engaged with the shaft, the rotor assembly comprising a rotor disk extending between the armature coils, the rotor disk comprising an inner portion and an outer portion, wherein the outer portion of the rotor disk comprises a plurality of circumferentially-spaced, magnetic poles, the rotor disk being coupled to the shaft for rotation about the shaft and generation of a rotating permeance wave,
wherein the stationary superconducting field coil is disposed between the stator yoke and the rotor disk, wherein the stationary superconducting field coil is configured as a stationary magneto-motive force (MMF) source for the rotating permeance wave produced by the rotor assembly to produce a rotating magnetic field,
wherein the stator assembly further comprises a pair of stator cores mechanically coupled to the stator yoke, wherein each of the stator coils is mounted on a respective one of the stator cores, wherein the shaft is rotatably mounted in the stator yoke on a plurality of bearings, wherein the stator cores comprise a non-magnetic material, and wherein the inner portion of the rotor disk comprises a non-magnetic material.

8. A machine comprising:
a stator assembly comprising a stator yoke, a pair of armature coils mechanically coupled to the stator yoke, and a stationary superconducting field coil, wherein the stator yoke comprises a magnetic material;
a shaft rotatably mounted in the stator yoke, the shaft comprising a non-magnetic material; and
a rotor assembly rotationally engaged with the shaft, the rotor assembly comprising a rotor disk extending between the armature coils, the rotor disk comprising an inner portion and an outer portion, wherein the outer portion of the rotor disk comprises a plurality of circumferentially-spaced, magnetic poles, the rotor disk being coupled to the shaft for rotation about the shaft and generation of a rotating permeance wave,
wherein the stationary superconducting field coil is disposed between the stator yoke and the rotor disk, wherein the stationary superconducting field coil is configured as a stationary magneto-motive force (MMF) source for the rotating permeance wave produced by the rotor assembly to produce a rotating magnetic field, and wherein the outer portion of the rotor disk comprises a magnetic material forming the magnetic poles and a non-magnetic material forming a plurality of non-magnetic regions separating the magnetic poles.

9. A machine comprising:
- a stator assembly comprising a stator frame, a pair of armature coils mechanically coupled to the stator frame, and at least one stationary superconducting field coil;
- a shaft rotatably mounted in the stator frame, the shaft comprising a non-magnetic material; and
- a rotor assembly rotationally engaged with the shaft, the rotor assembly comprising a rotor disk extending between the armature coils, the rotor disk comprising an inner portion and an outer portion, each of the inner and outer portions comprising at least one magnetic material, wherein the outer portion of the rotor disk comprises a plurality of circumferentially-spaced, magnetic poles, the rotor disk being coupled to the shaft for rotation about the shaft and generation of a rotating permeance wave,
- wherein the stationary superconducting field coil is coupled to an interior portion of the stator frame, and wherein the stationary field coil is configured as a stationary magneto-motive force (MMF) source for the rotating permeance wave produced by the rotor assembly to produce a rotating magnetic field,
- wherein the stator assembly comprises a pair of stationary superconducting field coils, wherein each of the stationary superconducting field coils is coupled to a respective interior portion of the stator frame, and wherein each of the stationary superconducting field coils is configured as a stationary magneto-motive force (MMF) source for the rotating permeance wave produced by the rotor assembly to produce a rotating magnetic field.

10. The machine of claim 9, wherein the rotating magnetic field is characterized by a flux loop that extends along the stator frame, across the inner portion of the rotor disk, and across the outer portion of the rotor disk to supply a time varying magnetic flux to the armature coils.

11. The machine of claim 9, wherein the stator assembly further comprises a pair of stator cores mechanically coupled to the stator frame, wherein each of the stator coils is mounted on a respective one of the stator cores, and wherein the shaft is rotatably mounted in the stator frame on a plurality of bearings.

12. The machine of claim 11, wherein the stator cores comprise a magnetic material.

13. The machine of claim 9, wherein the stationary superconducting field coil is configured to generate a peak field value in the machine of at least about 1.5 Tesla.

14. The machine of claim 9, wherein the armature windings comprise superconducting armature windings.

15. The machine of claim 9, further comprising a plurality of rotor and stator assemblies arranged along the shaft.

16. A machine comprising:
- a stator assembly comprising a stator frame, a pair of armature coils mechanically coupled to the stator frame, and at least one stationary superconducting field coil;
- a shaft rotatably mounted in the stator frame, the shaft comprising a non-magnetic material; and
- a rotor assembly rotationally engaged with the shaft, the rotor assembly comprising a rotor disk extending between the armature coils, the rotor disk comprising an inner portion and an outer portion, each of the inner and outer portions comprising at least one magnetic material, wherein the outer portion of the rotor disk comprises a plurality of circumferentially-spaced, magnetic poles, the rotor disk being coupled to the shaft for rotation about the shaft and generation of a rotating permeance wave,
- wherein the stationary superconducting field coil is coupled to an interior portion of the stator frame, wherein the stationary field coil is configured as a stationary magneto-motive force (MMF) source for the rotating permeance wave produced by the rotor assembly to produce a rotating magnetic field, and wherein the outer portion of the rotor disk comprises a magnetic material forming the magnetic poles and a non-magnetic material forming a plurality of non-magnetic regions separating the magnetic poles.

17. A machine comprising:
- a stator assembly comprising a stator frame, a pair of magnetic stator portions mechanically coupled to the stator frame, a pair of stator cores mechanically coupled to respective ones of the magnetic stator portions, a pair of armature coils mounted on respective ones of the stator cores, and at least one stationary superconducting field coil, wherein the stator frame comprises a non-magnetic material;
- a shaft rotatably mounted in the stator frame, the shaft comprising a magnetic material; and
- a rotor assembly rotationally engaged with the shaft, the rotor assembly comprising a rotor disk extending between the armature coils, the rotor disk comprising an inner portion and an outer portion, wherein the outer portion of the rotor disk comprises a plurality of circumferentially-spaced, magnetic poles, the rotor disk being coupled to the shaft for rotation about the shaft and generation of a rotating permeance wave, wherein the inner portion of the rotor disk comprises a non-magnetic material,
- wherein the stationary superconducting field coil is disposed between the shaft and a respective one of the stator cores, and wherein the stationary field coil is configured as a stationary magneto-motive force (MMF) source for the rotating permeance wave produced by the rotor assembly to produce a rotating magnetic field.

18. The machine of claim 17, wherein the rotating magnetic field is characterized by a flux loop that extends along the shaft, along the magnetic stator portions and across the outer portion of the rotor disk and the stator cores to supply a time varying magnetic flux to the armature coils.

19. The machine of claim 17, wherein the shaft is rotatably mounted in the stator frame on a plurality of bearings.

20. The machine of claim 17, wherein the stator cores comprise a magnetic material.

21. The machine of claim 17, wherein the outer portion of the rotor disk comprises a magnetic material forming the magnetic poles and a non-magnetic material forming a plurality of non-magnetic regions separating the magnetic poles.

22. The machine of claim 17, wherein the armature windings comprise superconducting armature windings.

23. The machine of claim 17, wherein the stator assembly comprises a pair of stationary superconducting field coils.

* * * * *

UNITED STATES PATENT AND TRADEMARK OFFICE
CERTIFICATE OF CORRECTION

PATENT NO. : 7,492,073 B2
APPLICATION NO. : 11/479586
DATED : February 17, 2009
INVENTOR(S) : Qu et al.

Page 1 of 1

It is certified that error appears in the above-identified patent and that said Letters Patent is hereby corrected as shown below:

In Column 5, Line 45, delete "n" and insert -- II --, therefor.

In Column 6, Line 66, delete "270;" and insert -- 270. --, therefor.

In Column 9, Line 13, delete "cores" and insert -- cores. --, therefor.

In Column 11, Line 22, in Claim 9, after "frame," delete "and".

Signed and Sealed this

Twenty-first Day of July, 2009

JOHN DOLL
*Acting Director of the United States Patent and Trademark Office*